US012412717B2

(12) United States Patent
Yao et al.

(10) Patent No.: US 12,412,717 B2
(45) Date of Patent: Sep. 9, 2025

(54) RELAY WITH ARC EXTINGUISHING DEVICES

(71) Applicant: BYD COMPANY LIMITED, Guangdong (CN)

(72) Inventors: Baotong Yao, Shenzhen (CN); Lujian Wang, Shenzhen (CN); Siyuan Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 228 days.

(21) Appl. No.: 18/009,262

(22) PCT Filed: Apr. 28, 2021

(86) PCT No.: PCT/CN2021/090547
§ 371 (c)(1),
(2) Date: Dec. 8, 2022

(87) PCT Pub. No.: WO2021/249056
PCT Pub. Date: Dec. 16, 2021

(65) Prior Publication Data

US 2023/0230789 A1 Jul. 20, 2023

(30) Foreign Application Priority Data

Jun. 9, 2020 (CN) ........................ 202021053107.X

(51) Int. Cl.
*H01H 50/54* (2006.01)
*H01H 9/30* (2006.01)
*H01H 50/02* (2006.01)

(52) U.S. Cl.
CPC ............ *H01H 50/546* (2013.01); *H01H 9/30* (2013.01); *H01H 50/02* (2013.01)

(58) Field of Classification Search
CPC ........ H01H 50/546; H01H 9/30; H01H 50/02; H01H 9/0066; H01H 1/20; H01H 50/58;
(Continued)

(56) References Cited

U.S. PATENT DOCUMENTS

2009/0096559 A1 4/2009 Yano
2018/0197710 A1* 7/2018 Yao .................... H01H 85/2045
(Continued)

FOREIGN PATENT DOCUMENTS

CN 104091727 A 10/2014
CN 105679610 A 6/2016
(Continued)

OTHER PUBLICATIONS

English Translation of International Search Report from PCT/CN2021/090547 dated Jul. 30, 2021 (2 pages).

*Primary Examiner* — Shawki S Ismail
*Assistant Examiner* — Lisa N Homza
(74) *Attorney, Agent, or Firm* — Calfee, Halter & Griswold LLP

(57) ABSTRACT

A relay includes a housing, a contact assembly and an auxiliary contact assembly. The contact assembly includes the movable contacts adapted to move towards or away from the stationary contacts under the driving of the movable contact bridge. The auxiliary contact assembly includes an auxiliary contact bridge and auxiliary contacts. At least portion of each of the auxiliary contacts extends into the housing. The auxiliary contact bridge moves synchronously with the movable contact bridge to be selectively and electrically connected to the auxiliary contacts. The housing includes a top surface spaced apart from the stepped portion in the movement direction of the movable contact bridge or the auxiliary contact bridge. The stationary contacts are arranged on the top surface of the housing. The portion of
(Continued)

each of the auxiliary contacts arranged outside the housing is arranged on each of the stepped portions.

11 Claims, 6 Drawing Sheets

(58) Field of Classification Search
CPC ...... H01H 50/08; H01H 9/443; H01H 50/023; H01H 50/541; H01H 50/54
USPC .......................................................... 335/185
See application file for complete search history.

(56) References Cited

U.S. PATENT DOCUMENTS

| | | | | |
|---|---|---|---|---|
| 2019/0074151 | A1* | 3/2019 | Huang | H01H 50/58 |
| 2020/0294747 | A1* | 9/2020 | Yao | H01H 50/58 |
| 2020/0321178 | A1* | 10/2020 | Huang | H01H 50/14 |

FOREIGN PATENT DOCUMENTS

| | | | |
|---|---|---|---|
| CN | 106449279 | A | 2/2017 |
| CN | 107204250 | A | 9/2017 |
| CN | 107204252 | A | 9/2017 |
| CN | 107507738 | A | 12/2017 |
| CN | 107851543 | A | 3/2018 |
| CN | 108447739 | A | 8/2018 |
| CN | 110349811 | A | 10/2019 |
| CN | 110473744 | A | 11/2019 |
| CN | 209822572 | U | 12/2019 |
| CN | 212810187 | U | 3/2021 |
| EP | 3432337 | A1 | 1/2019 |
| JP | 2005339948 | A | 12/2005 |
| JP | 2018113139 | A | 7/2018 |

* cited by examiner

RELAY WITH ARC EXTINGUISHING DEVICES

CROSS-REFERENCE TO RELATED APPLICATIONS

The present disclosure is the National Stage of PCT International Application No. PCT/CN2021/090547, filed on Apr. 28, 2021, which claims priority to Chinese Patent Application No. "202021053107. X", entitled "RELAY" and filed on Jun. 9, 2020 by BYD Company Limited. The entire contents of the above-referenced applications are incorporated herein by reference.

FIELD

The present disclosure relates to the technical field of relays, and more specifically to a relay.

BACKGROUND

In the related art, for a relay with auxiliary contacts, the on-off states of high-voltage main contacts are monitored mainly by applying low-voltage sampling signals to the auxiliary contacts through the on-off states of the low-voltage auxiliary contacts so as to learn whether the main contacts are normally switched on and off, and whether a fault phenomenon such as closed non-conduction or contact sintering occurs.

At present, in the market, the common relay with reed structure has a simple structure, but the distance between the auxiliary contact and the main contact is too close, which increases the risk of high and low voltage breakdown between the main contact and the auxiliary contact when the contact is arcing with load.

SUMMARY

The present disclosure is to resolve at least one of the technical problems in the related art. To this end, one objective of the present disclosure is to provide a relay with relatively high safety in use.

The relay according to an embodiment of the present disclosure includes a housing, a contact assembly, and an auxiliary contact assembly. The contact assembly includes movable contacts, stationary contacts and a movable contact bridge. The movable contacts are adapted to move towards or away from the stationary contacts under the driving of the movable contact bridge. The auxiliary contact assembly includes an auxiliary contact bridge and auxiliary contacts. At least portion of each of the auxiliary contacts extends into the housing. The auxiliary contact bridge moves synchronously with the movable contact bridge to be selectively and electrically connected to the auxiliary contacts. The housing includes a top surface and stepped portions. The top surface is spaced apart from the stepped portion in the movement direction of the movable contact bridge or the auxiliary contact bridge. The stationary contacts are arranged on the top surface of the housing. A portion of each of the auxiliary contacts arranged outside the housing is arranged on each of the stepped portions.

According to the relay of the embodiment of the present disclosure, by providing the auxiliary contacts and making the portions of the auxiliary contacts outside the housing be spaced apart from the stationary contacts, on the premise of making the detection of the operating state of the contact assembly safer and more reliable, the occurrence of high and low voltage breakdown between the auxiliary contacts and the stationary contacts can be avoided, and the working stability of the relay can be improved.

According to some embodiments of the present disclosure, an area of the housing between two adjacent stationary contacts is formed as a stepped portion, and the auxiliary contacts corresponding to the two adjacent stationary contacts are all arranged in the stepped portion.

Further, the stepped portion is formed on a side wall of the housing, and the two auxiliary contacts corresponding to the two adjacent stationary contacts are arranged on the same stepped portion.

In some embodiments, the number of the stationary contacts is multiple, the multiple movable contacts electrically connected to each other are arranged on the movable contact bridge and correspond to the multiple stationary contacts on a one-to-one basis, and the movable contact bridge can selectively move towards the stationary contacts so as to conduct at least two of the multiple stationary contacts; and the number of auxiliary contacts is multiple, and the multiple auxiliary contacts correspond to the multiple stationary contacts on a one-to-one basis, and each of auxiliary contacts extends out of the housing and is far away from the stationary contact According to some embodiments of the present disclosure, the relay further includes arc extinguishing devices. The number of the arc extinguishing devices is multiple. Each of the arc extinguishing devices is arranged on an outer side of the corresponding stationary contact and includes a cover and a magnetic member. The magnetic member is arranged on at least one of two side walls of the cover facing each other.

Further, the relay includes a driving member. The driving member is connected to the movable contact bridge and is adapted to move the movable contacts towards or away from the stationary contacts.

Optionally, a first armature is arranged on the movable contact bridge, a second armature is arranged in the accommodating groove of the housing, and the first armature and the second armature are adapted to be magnetically attracted when the movable contact conducts the corresponding stationary contact.

In some embodiments, the driving member includes a fixed seat, an elastic member and a driving rod, one end of the elastic member is fixed on the fixed seat, the other end of the elastic member pushes against the movable contact, and the driving rod is fixed on the fixed seat to push the fixed seat to move.

Further, the relay includes a fixed support, the elastic member is arranged in the fixed support, a lower end of the fixed support is connected to the fixed seat, a guide groove is formed in an upper end of the fixed support, and a guide block cooperating with the guide groove is arranged on the first armature.

Further, the fixed seat is configured as an insulator.

Additional aspects and advantages of the present disclosure are partially provided in the following description, and partially become apparent in the following description or understood through the practice of the present disclosure.

BRIEF DESCRIPTION OF THE DRAWINGS

The above and/or additional aspects and advantages of the present disclosure will become evident and easy to understand through embodiments described with reference with drawings outlined below.

REFERENCE NUMERALS OF THE ACCOMPANYING DRAWING

Figure 1:
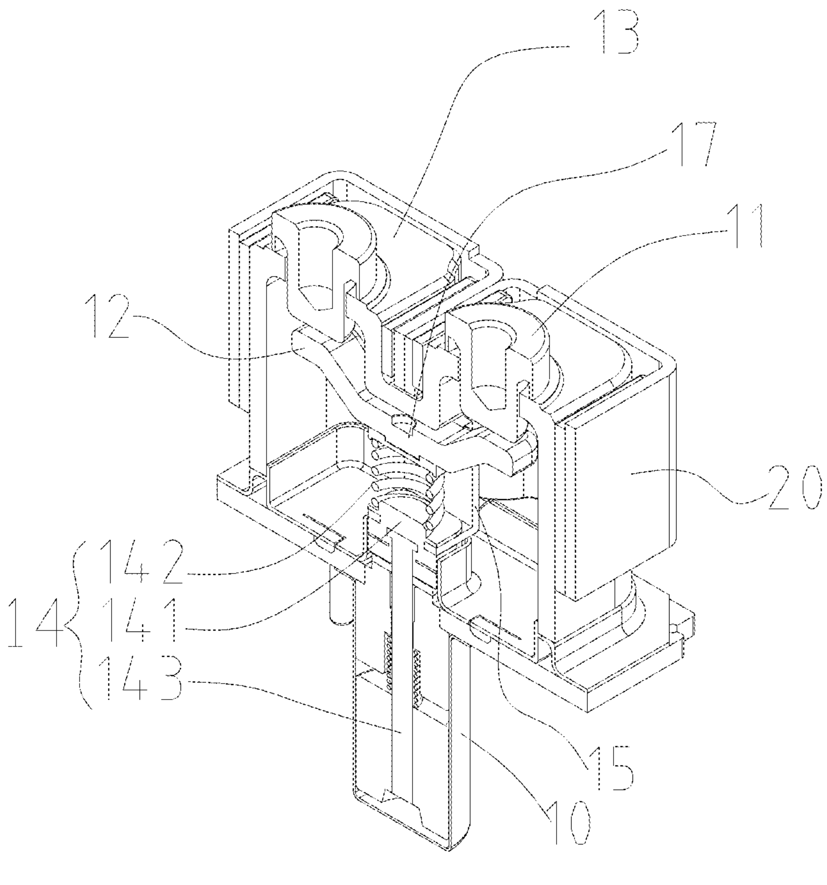
FIG. 1 is a schematic cross-sectional view of a relay according to an embodiment of the present disclosure.

Relay 100,

Relay body 10, stationary contact 11, movable contact 12, housing 13, accommodating groove 131, stepped portion 132, driving member 14, fixed seat 141, elastic member 142, driving rod 143, fixed support 15, guide groove 151, auxiliary contact 16, movable contact bridge 17, first armature 18, guide block 181, arc extinguishing device 20, cover 21, first end portion 211, second end portion 212, connecting portion 213, and magnetic member 22.

DETAILED DESCRIPTION

Embodiments of the present disclosure are described in detail below, and examples of the embodiments are shown in accompanying drawings, where the same or similar elements or the elements having same or similar functions are denoted by the same or similar reference numerals throughout the description. The embodiments that are described with reference to the accompanying drawings are exemplary, and are only used to interpret the present disclosure, instead limiting the present disclosure.

A relay 100 according to an embodiment of the present disclosure is described below with reference to FIGS. 1-6.

As shown in FIGS. 1. 2 and 3, the relay 100 according to an embodiment of the present disclosure includes: a housing 13, a contact assembly and an auxiliary contact assembly.

Among others, the contact assembly includes: movable contacts 12, stationary contacts 11 and a movable contact bridge 17, and the movable contacts 12 are adapted to move towards or away from the stationary contacts 11 under the driving of the movable contact bridge 17.

The auxiliary contact assembly includes: an auxiliary contact bridge (not shown in the figures) and auxiliary contacts 16, at least portion of each of the auxiliary contacts 16 extends into the housing 13, and the auxiliary contact bridge moves synchronously with the movable contact bridge 17 to be selectively and electrically connected to the auxiliary contacts 16.

In particular, the auxiliary contact bridge is adapted to move synchronously with the movable contact bridge 17 under the driving of the driving member 14. Thus, when the movable contacts 12 are electrically connected to the stationary contacts 11, the auxiliary contact bridge moves synchronously towards the auxiliary contacts 16 to conduct the auxiliary contact bridge and the auxiliary contacts 16.

It will be appreciated that the housing 13 includes: a top face and stepped portions 132, the top surface is spaced apart from the stepped portions 132 in the movement direction of the movable contact bridge 17 or the auxiliary contact bridge, the stationary contacts 11 are arranged on the top surface of the housing 13, and a portion of each of the auxiliary contacts 16 arranged outside the housing 13 is arranged on each of the stepped portions 132.

Specifically, when the contact assembly is in a conduction position (high-voltage conduction), the auxiliary contact bridge is electrically connected to the auxiliary contacts 16, so that the auxiliary contacts 16 are also conducted (low-voltage conduction), the contact assembly is broken, and the auxiliary contact assembly is also broken, that is, the communication state between the contact assemblies can be determined by detecting the connection state between the auxiliary contacts 16.

When the contact assembly is worn and cannot be normally conducted (at a conduction position, but the movable contact bridge 17 cannot be in contact with the stationary contacts 11) and cannot be normally disconnected (the movable contact bridge 17 and the stationary contacts 11 are sintered or arcing is formed between the movable contacts 12 and the stationary contacts 11), the state of the contact assembly can be determined according to the conduction condition of the auxiliary contacts 16 and the conduction condition of a circuit where the auxiliary contact assembly is.

Furthermore, the auxiliary contacts 16 are arranged on the stepped portions 132, and the stationary contacts 11 are arranged on the top surface of the housing 13, so that the auxiliary contacts 16 and the stationary contacts 11 are spaced apart in the movement direction of the movable contact bridge 17 or the auxiliary contact bridge, so as to ensure that the distance between the auxiliary contacts 16 and the stationary contacts 11 always meets the use requirements during the operation of the relay 100, so as to avoid a continuous arc between the auxiliary contacts 16 and the stationary contacts 11 and avoid a high-low voltage breakdown phenomenon.

According to the relay 100 of the embodiment of the present disclosure, by arranging the auxiliary contacts 16 and making the portions of the auxiliary contacts 16 being outside the housing 13 be spaced apart from the stationary contacts 11, on the premise of making the detection of the operating state of the contact assembly safer and more reliable, the occurrence of high and low voltage breakdown between the auxiliary contacts 16 and the stationary contacts 11 can be avoided, and the working stability of the relay 100 can be improved.

According to the relay 100 of the embodiment of the present disclosure, the number of the stationary contacts 11 is multiple, and the multiple stationary contacts 11 are arranged on the housing 13; the movable contact bridge 17 is provided with multiple movable contacts 12 electrically connected to each other, the multiple movable contacts 12 correspond to the multiple stationary contacts 11 on a one-to-one basis, and the movable contact bridge 17 can selectively move towards or away from the stationary contacts 11 so as to conduct at least two of the multiple stationary contacts 11; and the number of auxiliary contacts 16 is multiple, and the multiple auxiliary contacts 16 correspond to the multiple stationary contacts 11 on a one-to-one basis, and each of the auxiliary contacts 16 extends out of the housing.

Specifically, the movable contact bridge 17 is adapted to drive the movable contacts 12 to move towards the stationary contacts 11 so as to conduct at least two of the multiple stationary contacts 11 via at least two of the multiple movable contacts 12 electrically connected to each other (namely, high-voltage circuits where the movable contacts 12 and the stationary contacts 11 are arranged are conducted); the auxiliary contacts 16 and the stationary contacts 11 are correspondingly arranged, the auxiliary contacts 16 extend out of the housing 13, and when the high-voltage circuits where the stationary contacts 11 and the movable contacts 12 are arranged are conducted, the auxiliary contacts 16 corresponding to the stationary contacts 11 are connected to detection circuits (the detection circuits are low-voltage circuits), so that the detection of the high-voltage circuits where the movable contacts 12 and the stationary contacts 11 are arranged is achieved by detecting interfaces of the auxiliary contacts 16 in the low-voltage circuits.

According to the relay 100 of the embodiment of the present disclosure, the detection of the operating state of the high-voltage circuits where the stationary contacts 11 and the movable contacts 12 are arranged is made safer and more reliable by arranging the auxiliary contacts 16 and arranging the auxiliary contacts 16 outside the housing 13, furthermore, the connection of the auxiliary contacts 13 and detection components is made simpler and more convenient by arranging the auxiliary contacts 16 outside the housing 13, and thus, the detection of the operating state of the relay 100 is made simpler and more convenient.

It is to be understood that the stationary contacts 11 may be configured as the multiple stationary contacts sequentially connected in parallel or the multiple stationary contacts connected in series.

Figure 4:
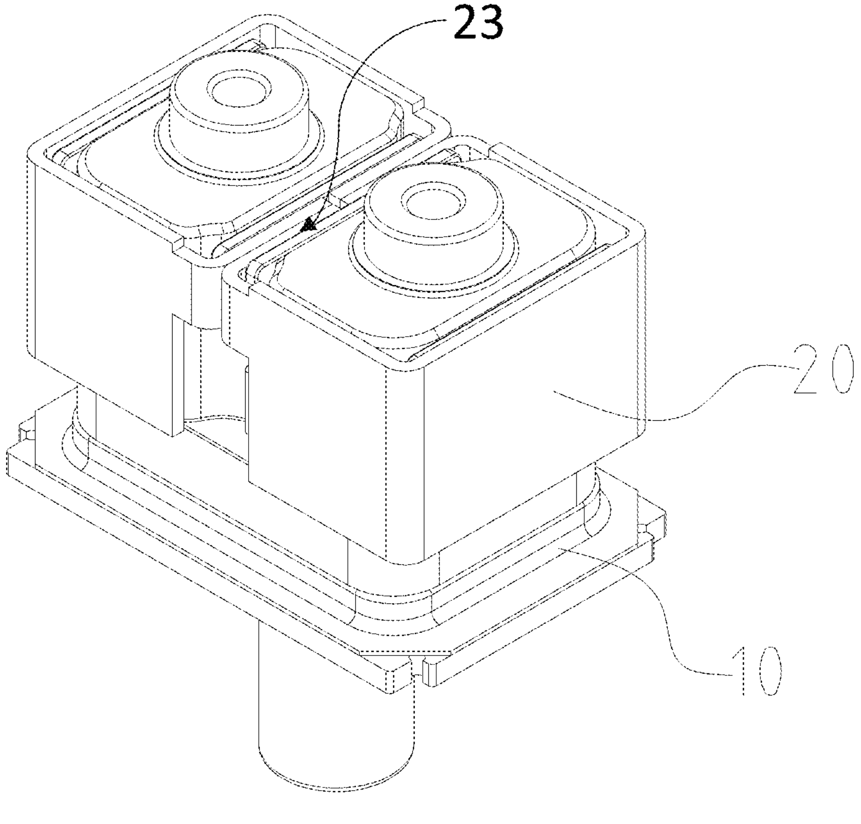
FIG. 4 is a cooperation schematic view of an arc extinguishing device and a housing of a relay according to an embodiment of the present disclosure.

As shown in FIG. 4, an area of the housing 13 arranged between two adjacent stationary contacts 11 is formed as a stepped portion 132, and the auxiliary contacts 16 corresponding to the two adjacent stationary contacts 11 are all arranged in the stepped portion 132, and the stepped portion 132 is spaced apart from the top surface of the housing 13 and is adjacent to the bottom surface of the housing 13.

In other words, the stepped portion 132 is formed on the side wall of the housing 13, the two auxiliary contacts 16 corresponding to the two adjacent stationary contacts 11 are arranged on the same stepped portion 132, the upper end of each stationary contact 11 protrudes from the upper end surface of the corresponding cover 21, each of the auxiliary contacts 16 is arranged the corresponding stepped portion 132, and the stepped portion 132 is spaced apart from the top surface of the housing 13 in the height direction.

Figure 2:
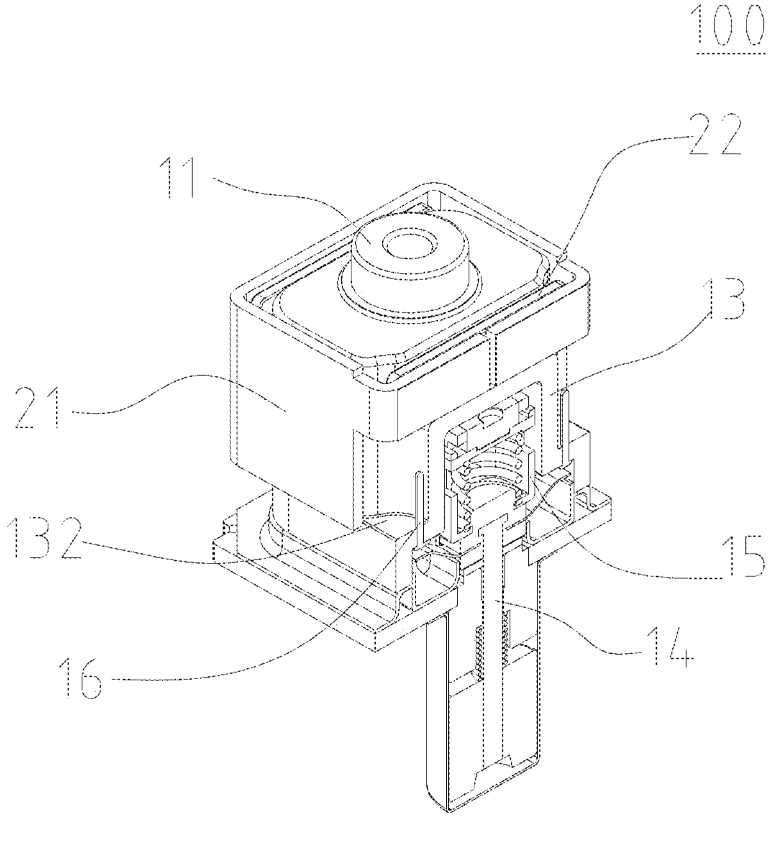
FIG. 2 is another schematic view of a relay according to an embodiment of the present disclosure.

In this way, on the one hand, the upper end of each stationary contact 11 is made to protrude from the upper end surface of the cover 21 so as to facilitate the electrical connection of surrounding components electrically connected to the stationary contact 11 and the stationary contact 11, and in one embodiment, the working stability of the relay 100 is improved, while the height of the relay 100 can also be reduced; on the other hand, a continuous arc between the auxiliary contact 16 and the stationary contact 11 can be avoided, the high-low voltage breakdown is avoided, and the working stability and use safety of the relay 100 are improved. As shown in FIG. 1 and FIG. 2, the number of arc extinguishing devices 20 is multiple, each arc extinguishing device 20 is arranged on an outer side of the corresponding stationary contact 11 and includes a cover 21 and a magnetic member 22, and the magnetic member 22 is arranged on at least one of two side walls of the cover 21 facing each other.

That is to say, one arc extinguishing device 20 is arranged outside each stationary contact 11, and an electric arc generated when the movable contact 12 is separated from the stationary contact 11 can be extinguished by the corresponding arc extinguishing device 20. It should be noted that electric arc is a gas discharge phenomenon, which has a certain hazard to electric appliances. The arc extinguishing means that the electric arc is elongated under the action of the magnetic field force of the magnetic field of the arc extinguishing device 20 to extinguish the electric arc for solving the influence of the electric arc in the electric appliance. If the electric arc is a direct current electric arc, after the electric arc is elongated, the static volt-ampere characteristic moves up, and the electric arc can be extinguished; and if the electric arc is an alternating current electric arc, after the electric arc is elongated, reignition of the electric arc is difficult due to an increase in arcing voltage.

The magnetic member 22 is arranged on at least one of the two side walls of the cover 21 facing each other and is between the side walls of the cover 21 facing each other, which can make the magnetic field be generated in the cover 21, and the electric arc generated when the movable contact 12 is separated from the stationary contact 11 is pulled away from the movable contact 12 and the stationary contact 11 under the action of the magnetic field force, so as to elongate the electric arc to accelerate arc extinction and improve the arc extinction effect of the relay 100.

In one embodiment, the cover 21 includes a first end portion 211, a second end portion 212, and a connecting portion 213 connecting the first end portion 211 and the second end portion 212, a side wall of the first end portion 211 is directly opposite to a side wall of the second end portion 212, the magnetic member 22 is arranged on the side wall of the first end portion 211, the magnetic member 22 is arranged between the first end portion 211 and the second end portion 212, and one side of the magnetic member 22 facing away from the side wall of the second end portion 212 is in contact with the first end portion 211, so that the second end portion 212 forms a polarity different from a polarity of the magnetic member 22 facing the second end portion 212.

For example, one side of the magnetic member 22 facing the second end portion 212 is N-pole, one side of the magnetic member 22 contacting with the first end portion 211 is S-pole, the second end portion 212 forms the polarity of the S-pole, a magnetic field in which magnetic induction lines face the second end portion 212 from the magnetic member 22 is formed in the cover 21, the stationary contact 11 is in the magnetic field, and when the movable contact 12 is separated from the stationary contact 11, the generated electric arc is elongated under the action of the magnetic field force, and the arc extinguishing is accelerated.

It will be appreciated that the arrangement of only one magnetic member 22 in the cover 21 is an embodiment of the present disclosure and that the arrangement of the magnetic members 22 at both ends of the cover 21 can increase the strength of the magnetic field.

Figure 6:
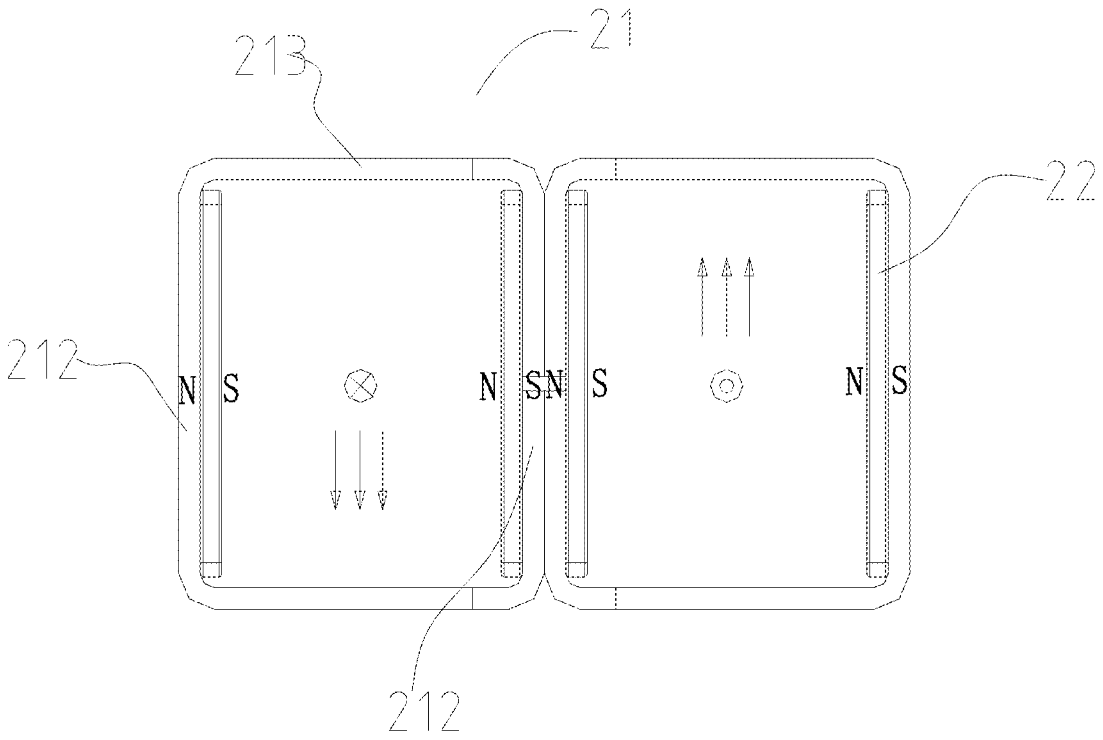
FIG. 6 is a schematic top view of an arc extinguishing device of a relay according to an embodiment of the present disclosure.

In the embodiment shown in FIG. 6, the two magnetic members 22 are respectively arranged on the side walls of the first end portion 211 and the second end portion 212, which are opposite to each other, and the opposite sides of the two magnetic members 22 have different polarities, thereby increasing the magnetic field strength in the cover 21 compared to the case where only one magnetic member 22 is arranged. In addition, the cover 21 has a magnetism gathering effect, and the cover 21 in combination with the magnetic member 22 further increases the magnetic field intensity in the cover 21 to improve the arc extinguishing effect of the arc extinguishing device 20.

The directions of the electric currents of the two electrically connected stationary contacts 11 are respectively inflow and outflow, and the directions of the magnetic induction lines formed between the two magnetic members 22 in the two arc extinguishing devices 20 are the same, so that the directions of the magnetic field forces acting on the electric arcs generated in the two arc extinguishing devices 20 are away from each other, the electric arcs in the two arc extinguishing devices 20 move in opposite directions, the electric arcs are elongated and are rapidly extinguished, meanwhile, the relay 100 has no polarity, and the use safety and adaptability are improved.

As shown in FIG. 6, according to some embodiments of the present disclosure, the directions of the magnetic induction lines formed between the two magnetic members 22 in the multiple arc extinguishing devices 20 are the same. Thus, the directions of electric currents of the two stationary contacts 11 connected via the movable contact 12 are opposite, and when electric currents are generated in the two stationary contacts 11, the magnetic fields in which the two stationary contacts 11 are located respectively generate magnetic flux forces with equal magnitude and opposite directions, so that the electric arcs generated on the two stationary contacts 11 respectively move in opposite directions under the action of the magnetic flux forces, so as to effectively avoid the occurrence of a continuous arcing in the electric arcs, make the cut-off effect of the relay 100 better, and improve the use safety of the relay 100.

Figure 3:
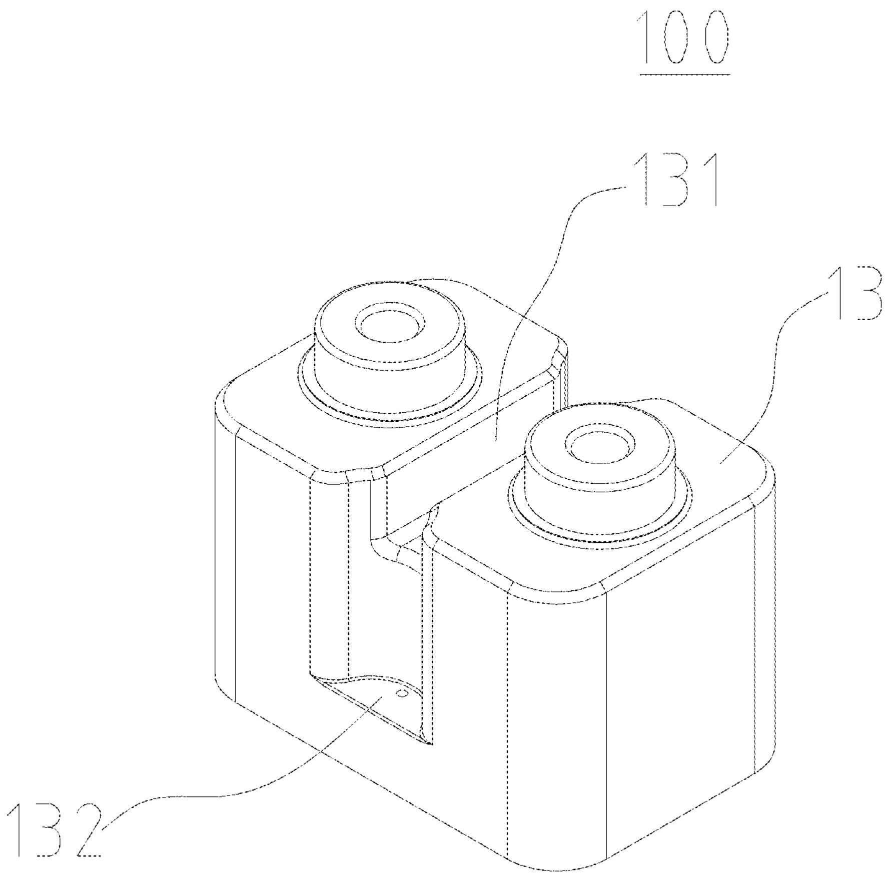
FIG. 3 is a schematic view of a housing of a relay according to an embodiment of the present disclosure.

As shown in FIG. 3, in some embodiments, the relay body 10 further includes the housing 13, at least portion of the housing 13 is arranged on the periphery of the multiple stationary contacts 11, the housing 13 is provided with an accommodating groove 131 between the two adjacent stationary contacts 11, and at least portion of the cover 21 extends into the accommodating groove 131 so as to be fixed on the housing 13.

In other words, the housing 13 is provided with multiple through-holes, one stationary contact 11 is arranged in each through-hole, and the stationary contact 11 is in sealed connection with the housing 13; furthermore, the accommodating groove 131 is arranged between two adjacent stationary contacts 11, so that the cover 21 of the arc extinguishing device 20 corresponding to each stationary contact 11 can protrude into the accommodating groove 131, thereby improving the fixing effect of the arc extinguishing device 20 on the housing 13, and making the structure of the relay 100 more reasonable and the arc extinguishing effect of the multiple arc extinguishing devices 20 fixed on the housing 13 more stable and reliable.

In addition, it should be noted that multiple gas flow chambers communicating with each other are correspondingly formed inside the housing 13 by arranging the accommodating groove 131, gas can flow inside the multiple gas flow chambers, however, metal substances that are electrically ablated are isolated outside the housing 13, the insulation property and the voltage withstand performance of the relay 100 after a damage test of the metal substances caused by an electrical life, a short circuit, etc. are improved, and at the same time, the distance between the two adjacent stationary contacts 11 is made further by the accommodating groove 131, the creepage distance is increased, and the arc extinguishing effect can be improved in one embodiment.

In some embodiments, the multiple stationary contacts 11 include: positive stationary contacts and negative stationary contacts, the cover 21 outside the positive stationary contacts and the cover 21 outside the negative stationary contacts are attached to each other, and the attached side walls of the two covers are arranged in the accommodating groove 131.

In other words, among the multiple stationary contacts 11, the covers 21 of the adjacent positive stationary contact and negative stationary contact are arranged together in one accommodating groove 131, so that, on the one hand, the number of grooves in the housing 13 can be reduced, the production cost of the housing 13 can be lower, and the structural strength of the housing 13 can be higher, and on the other hand, the two adjacent covers 21 can be attached to the same accommodating groove 131 so as to improve the fixing effect of the adjacent arc extinguishing devices 20 in the accommodating groove 131.

Figure 5:
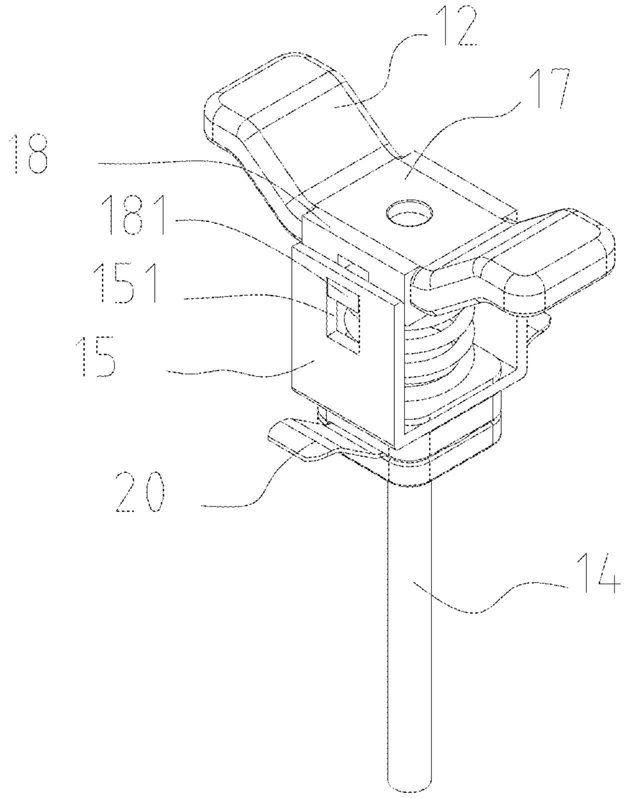
FIG. 5 is a cooperation schematic view of movable contacts and a driving member of a relay according to an embodiment of the present disclosure.

As shown in FIG. 5, the relay body 10 further includes a driving member 14, the movable contacts 12 and the stationary contacts 11 are arranged oppositely and are spaced apart, and the driving member 14 is connected to the movable contacts 12 and is adapted to move the movable contacts 12 towards or away from the stationary contacts 11.

Specifically, a sealed cavity is defined inside the housing 13, the movable contacts 12 and at least portion of the driving member 14 are arranged in the sealed cavity, the movable contacts 12 are spaced apart from the stationary contacts 11 in an initial state to maintain a certain electric clearance, and the movable contacts 12 can move towards or away from the stationary contacts 11 under the driving of the driving member 14, so that the on-off control of the relay 100 is simpler and more convenient.

In one embodiment, the relay 100 includes first armatures 18 and second armatures 23, each of the first armatures 18 is arranged on one side of each of the movable contacts 12 facing away from each of the stationary contacts 11, each of the second armatures 23 is arranged on one side of each of the movable contacts 12 facing each of the stationary contacts 11, and the first armatures 18 and the second armatures 23 are adapted to generate a magnetic attraction force when the movable contacts 12 conduct the corresponding stationary contacts 11 so as to press the movable contacts 12 against the corresponding stationary contacts 11.

In other words, each of the first armatures 18 is arranged on one side of each of the movable contacts 12 facing away from each of the stationary contacts 11, each of the second armatures is arranged on one side of each of the movable contacts 12 facing each of the stationary contacts 11, and the first armatures 18 and the second armatures are adapted to be magnetically attracted when the movable contacts 12 conduct the corresponding stationary contacts 11, and push against the movable contacts 12 by the magnetic attraction force so as to resist the repulsive force between the movable contacts 12 and the stationary contacts 11. In this way, in one embodiment, the working stability of the relay 10 can be improved, and the conduction effect between the movable contacts 12 and the stationary contacts 11 can be better.

In some embodiments, each of the first armatures 18 is arranged on one side of each of the movable contacts 12 facing away from each of the stationary contacts 11, the second armatures are arranged in the accommodating grooves 131 of the housing 13, and the first armatures 18 and the second armatures are adapted to be magnetically attracted when the movable contacts 12 conduct the corresponding stationary contacts 11.

Specifically, at least portion of the movable contact 12 is arranged between the first armature 18 and the second armature; when the movable contact 12 conducts the corresponding stationary contact 11, the first armature 18 and the second armature are magnetized, and the sides of the first armature 18 and the second armature facing each other are magnetically opposite, and generate a magnetic attraction force, which is formed as a force to push against the movable contact 12 to move towards the stationary contact 11, thereby improving the contact pressure between the stationary contact 11 and the movable contact 12, making the contact stability between the movable contact 12 and the stationary contact 11 higher, and improving the working operational stability of the relay 100.

It should be understood that "the arrangement of the first armature 18 on one side of the movable contact 12 away from the stationary contact 11, and the arrangement of the second armature in the accommodating groove 131" is merely one embodiment of the present disclosure, and in other embodiments, the second armature may not be arranged in the accommodating groove 131.

For example, the driving member 14 includes a driving device and a driving rod 143; the driving device drives the movable contact 12 to move towards or away from the stationary contact 11 by driving the driving rod 143; the driving rod 143 passes through the first armature 18, a movable contact plate 12 and the second armature in sequence, so that the first armature 18 and the second armature are respectively arranged at two sides of the movable contact 12; and when the movable contact 12 conducts the corresponding stationary contact 11, the first armature 18 and the second armature are magnetized, and the sides of the first armature 18 and the second armature facing each other are magnetically opposite, and generate a magnetic attraction force, which is formed as a force to push against the movable contact 12 to move towards the stationary contact 11, thereby improving the contact pressure between the stationary contact 11 and the movable contact 12.

The present disclosure does not define the specific arrangement positions of the first armature 18 and the second armature, and as long as the first armature 18 and the second armature are respectively at two sides of the movable contact 12, when the movable contact 12 conducts the corresponding stationary contact 11, the contact pressure between the stationary contact 11 and the movable contact 12 can be improved.

In the particular embodiment shown in FIG. 5, the driving member 14 includes a fixed seat 141, an elastic member 142 and a driving rod 143, one end of the elastic member 142 is fixed on the fixed seat 141, the other end of the elastic member 142 pushes against the movable contact 12, and the driving rod 143 is fixed on the fixed seat 141 to push the fixed seat 141 to move. In this way, the driving effect of the driving member 14 is better, and when the control movable contact 12 is controlled to be disconnected from the stationary contact 11, the response speed can be increased by the elastic member 142

In one embodiment, the fixed seat 141 is configured as an insulator. Thus, the driving rod 143 is prevented from being electrified, and the working stability and use safety of the relay 100 are improved.

In some embodiments, the relay body 10 further includes a fixed support 15, the elastic member 142 is arranged in the fixed support 15, a lower end of the fixed support 15 is connected to the fixed seat 141, a guide groove 151 is formed in an upper end of the fixed support 15, and a guide block 181 cooperating with the guide groove 151 is arranged on the first armature 18.

In this way, the movable contact 12 can stably contact with the stationary contact 11 under the pushing action of the elastic member 142 and the action of magnetic attraction force between the first armature 18 and the second armature, thus improving the working stability of the relay 10. The structure of the relay 100 of the present application will be described below in one embodiment.

The stationary contacts 11 are fixed on the housing 13 by brazing, the housing 13 is provided with the accommodating grooves 131, the accommodating grooves 131 are used for fixing the magnetic members 22 and the covers 21, the magnetic members 22 are arranged on two opposite sides of the cover 21, a magnetic circuit formed by the two magnetic members 22 constitutes one arc extinguishing device 20, and each stationary contact 11 is correspondingly provided with an arc extinguishing device 20.

In the housing 13, the movable contact 12 is arranged at a position which is relatively isolated from the contact position of the stationary contact 11 by a certain distance (an electrical clearance), a stamping protrusion is arranged on the lower surface of the movable contact 12 and is used for fixation with the first armature 18, and at the same time, the riveting fixation of the movable contact 12 and the first armature 18 can also be achieved via the stamping protrusion.

The first armature 18 is turned outwards on both sides to wrap the movable contact 12, and the turn-up edge is pressed inwards to be pressed and fixed with the movable contact 12. The fixed support 15 is a stamped and formed piece; the guide block 181 of the first armature 18 extends into the guide groove 151 of the fixed support 15; the driving rod 143 is formed by machining or cold heading; the fixed support 15 is connected to the driving rod 143 via the fixed seat 141; and the fixed seat 141 is configured as an insulator, does not have a direct contact with the fixed support 15, and plays a role in high and low voltage insulation.

A fixing position of the elastic member 142 is provided on the fixed support 15 and the fixed seat 141; after the elastic member 142 is loaded, the first armature 18 riveted with the movable contact 12 is clamped into the fixed support 15; two ends of the elastic member 142 respectively push against a positioning hole of the first armature 18 and a positioning structure of the fixed seat 141 so as to fix the first armature 18 and the movable contact 12 to the fixed support 15; the guide block 181 extending out of the first armature 18 extends into a guide groove 151 reserved in the fixed support 15; and when the relay 100 operates, the first armature 18 can move up and down along the guide groove 151, thus, the connection and disconnection between the stationary contact 11 and the movable contact 12 of the relay 100, and the response speed is increased.

In the description of the present disclosure, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure.

In the description of the present disclosure, a "first feature", or a "second feature" can include one or more features.

In the description of the present disclosure, "multiple" means two or more than two.

In the description of the present disclosure, a first feature is "above" or "below" a second feature may include that the first feature directly contacts the second feature, or may include that the first feature does not contact the second feature directly but contacts the second feature through another feature between them.

In description of the present disclosure, the first feature being "over", "above", and "on" the second feature includes that the first feature is directly above or obliquely above the second feature, or only means that a horizontal height of the first feature is higher than that of the second feature.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In this specification, schematic descriptions of the foregoing terms do not necessarily point at a same embodiment or example. Moreover, the specific features, structures, materials, or characteristics described may be combined in any one or more embodiments or examples in an appropriate manner.

Although the embodiments of the present disclosure have been shown and described, a person of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A relay, comprising:

a housing;

a contact assembly which comprises movable contacts, stationary contacts and a movable contact bridge, wherein the movable contacts are adapted to move towards or away from the stationary contacts under the driving of the movable contact bridge;

an auxiliary contact assembly which comprises an auxiliary contact bridge and auxiliary contacts, wherein at least portion of each of the auxiliary contacts extends into the housing, and the auxiliary contact bridge moves synchronously with the movable contact bridge to be selectively and electrically connected to the auxiliary contacts; wherein the housing comprises a top surface and stepped portions, the top surface is spaced apart from the stepped portion in the movement direction of the movable contact bridge or the auxiliary contact bridge, the stationary contacts are arranged on the top surface of the housing, and a portion of each of the auxiliary contacts arranged outside the housing is arranged on each of the stepped portions, the reply further comprises arc extinguishing devices, wherein the number of the arc extinguishing devices is multiple, each of the arc extinguishing devices is arranged on an outer side of the corresponding stationary contact and comprises a cover and a magnetic member, and the magnetic member is arranged on at least one of two side walls of the cover facing each other.

2. The relay of claim 1, wherein an area of the housing arranged between two adjacent stationary contacts is formed as a stepped portion, and the auxiliary contacts corresponding to the two adjacent stationary contacts are all arranged in the stepped portion.

3. The relay of claim 2, wherein the stepped portion is formed on a side wall of the housing, and the two auxiliary contacts corresponding to the two adjacent stationary contacts are arranged on the same stepped portion.

4. The relay of claim 3, wherein the number of the stationary contacts is multiple, the plurality of movable contacts electrically connected to each other are arranged on the movable contact bridge, and correspond to the plurality of stationary contacts on a one-to-one basis, and the movable contact bridge can selectively move towards the stationary contacts so as to conduct at least two of the plurality of stationary contacts; and the number of the auxiliary contacts is multiple, the plurality of the auxiliary contacts correspond to the plurality of stationary contacts on a one-to-one basis, and each of the auxiliary contacts extends out of the housing and is far away from the each of the stationary contacts.

5. The relay of claim 2, wherein the number of the stationary contacts is multiple, the plurality of movable contacts electrically connected to each other are arranged on the movable contact bridge, and correspond to the plurality of stationary contacts on a one-to-one basis, and the movable contact bridge can selectively move towards the stationary contacts so as to conduct at least two of the plurality of stationary contacts; and the number of the auxiliary contacts is multiple, the plurality of the auxiliary contacts correspond to the plurality of stationary contacts on a one-to-one basis, and each of the auxiliary contacts extends out of the housing and is far away from the each of the stationary contacts.

6. The relay of claim 1, wherein the number of the stationary contacts is multiple, the plurality of movable contacts electrically connected to each other are arranged on the movable contact bridge, and correspond to the plurality of stationary contacts on a one-to-one basis, and the movable contact bridge can selectively move towards the stationary contacts so as to conduct at least two of the plurality of stationary contacts; and the number of the auxiliary contacts is multiple, the plurality of the auxiliary contacts correspond to the plurality of stationary contacts on a one-to-one basis, and each of the auxiliary contacts extends out of the housing and is far away from the each of the stationary contacts.

7. The relay of claim 1, further comprising a driving member, wherein the driving member is connected to the movable contact bridge and is adapted to move the movable contacts towards or away from the stationary contacts.

8. The relay of claim 7, wherein a first armature is arranged on the movable contact bridge, a second armature is arranged in the accommodating groove of the housing, and the first armature and the second armature are adapted to be magnetically attracted when the movable contact conducts the corresponding stationary contact.

9. The relay of claim 7, wherein the driving member comprises a fixed seat, an elastic member and a driving rod, one end of the elastic member is fixed on the fixed seat, the other end of the elastic member pushes against the movable contact, and the driving rod is fixed on the fixed seat to push the fixed seat to move.

10. The relay of claim 9, further comprising a fixed support, wherein the elastic member is arranged in the fixed support, a lower end of the fixed support is connected to the fixed seat, a guide groove is formed in an upper end of the fixed support, and a guide block cooperating with the guide groove is arranged on the first armature.

11. The relay of claim 9, wherein the fixed seat is configured as an insulator.

* * * * *